United States Patent [19]

Quilliou

[11] Patent Number: 5,035,120
[45] Date of Patent: Jul. 30, 1991

[54] FREEZER

[75] Inventor: Guy Quilliou, Niort, France

[73] Assignee: Pierre Guerin S.A., Mauze-sur-le-Mignon, France

[21] Appl. No.: 522,546

[22] Filed: May 11, 1990

[30] Foreign Application Priority Data

May 22, 1989 [FR] France ................................ 89 06640

[51] Int. Cl.$^5$ .............................................. F25C 5/14
[52] U.S. Cl. .................................... 62/341; 100/93 P
[58] Field of Search ................ 62/341; 100/93 P, 194; 198/597

[56] References Cited

U.S. PATENT DOCUMENTS

| | | | |
|---|---|---|---|
| 3,557,975 | 1/1971 | Amerio | 198/597 |
| 4,030,962 | 6/1977 | Fitzwater | 100/93 P |
| 4,083,199 | 4/1978 | Gram | 62/341 |
| 4,342,205 | 8/1982 | Gram | 62/341 |

Primary Examiner—Ronald C. Capossela
Attorney, Agent, or Firm—Kurt Kelman

[57] ABSTRACT

A freezer comprises an insulated housing with two opposite walls defining an interior chamber therebetween, the walls respectively defining a charging opening and a discharge opening for respectively charging products to be frozen into the interior chamber and discharging the frozen products from the interior chamber, and a stack of horizontal freezer plates arranged in the interior chamber. Vertical screw jacks vertically displace the stack of freezer plates whereby they are successively moved to the level of the openings. To assure good lubrication at low temperatures, each screw jack comprises a screw element, a nut engaging the screw element, a tube element concentrically surrounding the screw element, the nut being affixed to one tube element end and the opposite tube element end being closed, and one of the screw jack elements being pendularly suspended from the freezer housing frame while the stack of freezer plates is suspended on the other screw jack element, and a tubular casing having a bottom, the tubular casing concentrically surrounding the tube element and the tube element passing fluid-tightly through the tubular casing bottom, the interiors of the tube element and of the tubular casing being in communication with each other to define an oil-filled closed space of a predetermined volume. A closed expansion reservoir of air is connected to an upper part of the closed space, and a motor is coupled to the one screw jack element for rotating the one screw jack element.

7 Claims, 2 Drawing Sheets

FREEZER

BACKGROUND OF THE INVENTION

The present invention relates to a freezer comprising an insulated housing having two opposite walls defining an interior chamber therebetween, the walls respectively defining a charging opening and a discharge opening for respectively charging products to be frozen into the interior chamber and discharging the frozen products from the interior chamber. A stack of hollow horizontal freezer plates through which a refrigerant fluid circulates is arranged in the interior chamber and means for vertically displacing the stack of freezer plates is provided to move the freezer plates successively to the level of the openings. The freezer further comprises means for charging the products to be frozen onto a respective freezer plate through the charging opening at a charging station and for simultaneously discharging the frozen product through the discharge opening. One type of freezer with vertically movable freezer plates has been disclosed in U.S. Pat. No. 3,557,975.

More particularly, this invention relates to freezers of this type wherein the vertical freezer plate displacement means comprises screw jacks. Such screw jacks have the advantage that they permit a precise vertical positioning of the freezer plates but they pose problems with respect to lubrification at the very low temperatures at which they must operate in the freezing chamber.

SUMMARY OF THE INVENTION

It is the primary object of the invention to assure effective and permanent lubrication of the moving parts of the screw jacks used in such a freezer and to avoid the formation of ice thereon.

The above and other objects are accomplished according to the present invention with a freezer which comprises an insulated housing including a frame and having two opposite walls defining an interior chamber therebetween, the walls respectively defining a charging opening and a discharge opening for respectively charging products to be frozen into the interior chamber and discharging the frozen products from the interior chamber. A stack of horizontal freezer plates is arranged in the interior chamber. The freezer further comprises vertical screw jack means for vertically displacing the stack of freezer plates whereby said freezer plates are successively moved to the level of the openings. Each screw jack comprises a screw element, a nut engaging the screw element, a tube element having two ends, the tube element concentrically surrounding the screw element, the nut being affixed to one of the tube element ends and the opposite tube element end being closed, and one of the screw jack elements being pendularly suspended from the freezer housing while the stack of freezer plates is suspended on the other screw jack element, a tubular casing having a bottom, the tubular casing concentrically surrounding the tube element and the tube element passing fluid-tightly through the tubular casing bottom, the interiors of the tube element and of the tubular casing being in communication with each other to define a closed space of a predetermined volume, and oil filling the closed space. A closed expansion reservoir of air is connected to an upper part of the closed space, and a motor is coupled to the one screw jack element for rotating the one screw jack element.

Due to this disposition, the screw jack is permanently lubricated and the renewal of air around the screw and the nut is avoided, which prevents the formation of ice on the threads since the water vapor which may initially be found in the air filling the jack and the expansion reservoir is condensed and frozen in the latter.

In a preferred embodiment, the housing has a frame comprising hollow post constituting the closed expansion reservoir of air and arranged adjacent the screw jack.

According to a preferred feature, the tubular casing is comprised of a translucent or transparent material, for example a glass fiber reinforced synthetic resin, which permits verification of the level of lubricating oil in the screw jack.

BRIEF DESCRIPTION OF THE DRAWING

The above and other objects, advantages and features of this invention will become more apparent from the following detailed description of a now preferred embodiment thereof, taken in conjunction with the accompanying, somewhat schematic drawing wherein.

DETAILED DESCRIPTION OF PREFERRED EMBODIMENT

Figure 1:
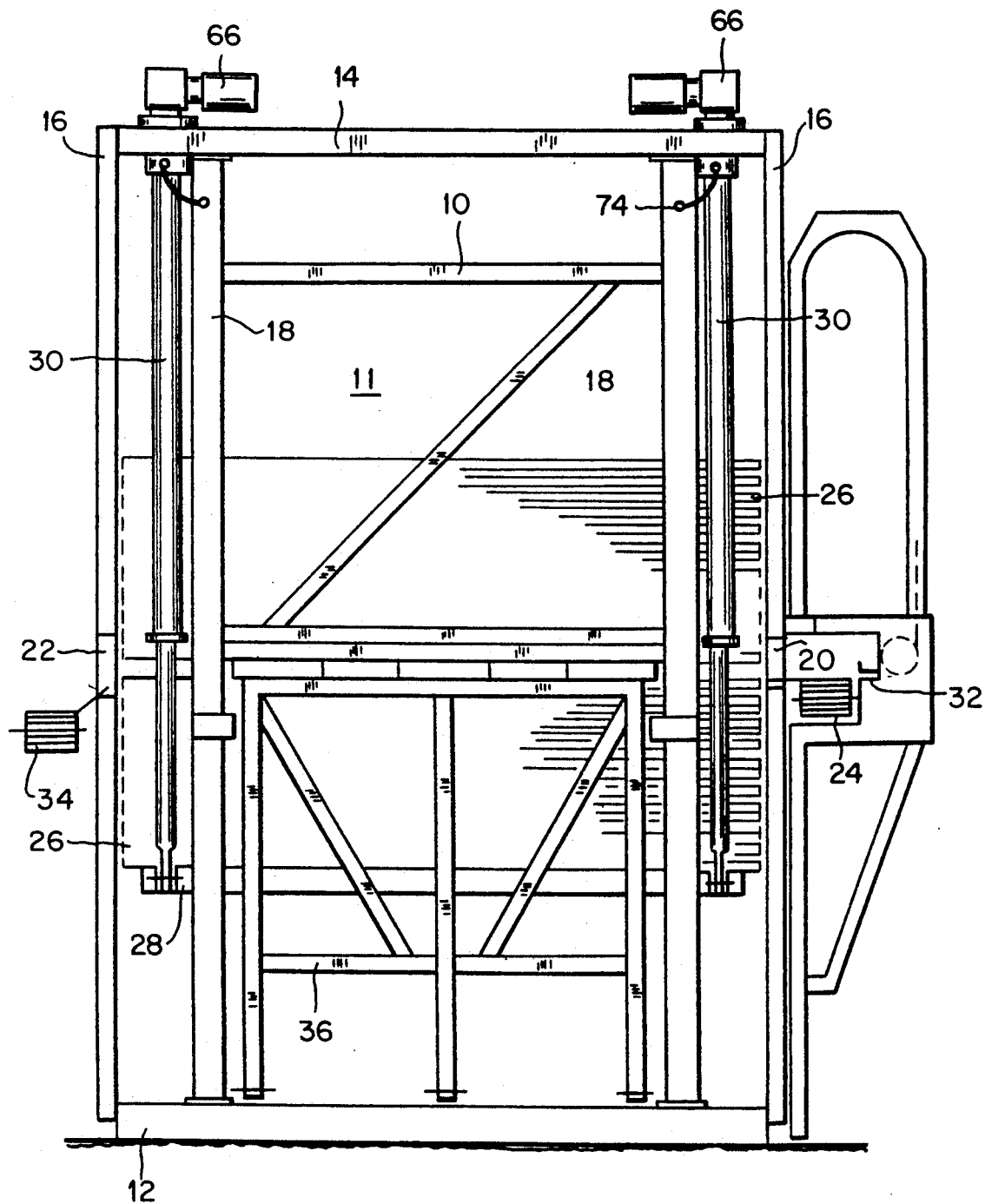
FIG. 1 is a side elevational view of a freezer incorporating the invention, one of the side walls of the freezer housing being removed to show the interior chamber thereof.

As shown in FIG. 1, the freezer comprises an insulated housing including frame 10 and having two opposite insulated walls 16, 16 defining interior chamber 11 therebetween, an insulated floor or bottom 12 and an insulated ceiling or top 14, front and rear walls 16 being interconnected by two opposite insulated side walls, thus providing a closed insulated freezing chamber. Front wall 16 defines charging opening or slit 20 for charging products to be frozen into interior chamber 11, and rear wall 16 defines discharge opening or slit 22 for discharging the frozen products from the interior chamber, the charging and discharge openings providing the sole communication of interior chamber 11 with the outside. Charging conveyor 24 and like discharge conveyor 34 are mounted outside the freezer housing at the level, and adjacent, the charging and discharge openings, respectively, to convey the products to and from the openings.

A stack of horizontal freezer plates 26 rests on platform 28 supported in interior chamber 11 by four screw jacks 30 suspended from the housing ceiling. The freezer plates are stacked on top of each other and spacers are wedged between adjacent freezer plates to keep them apart a distance slightly in excess of the thickness of the products to be frozen so that the same may be placed between the freezer plates for freezing. Vertical guides (not shown) prevent the stack of freezer plates from rocking.

To charge products to be frozen onto the freezer plates, the same are incrementally raised, one after the other, by screw jacks 30 to the level of charging conveyor 24 and the products are then introduced, row by row, through charging opening 20 into freezing chamber 11 by means of pusher bar 32, which pushes the products from the charging conveyor through the charging opening onto the freezer plate raised to the level of the charging opening. At the same time, the frozen products on this freezer plate are pushed through discharge opening 22 in rear wall 16 and come to rest on discharge conveyor 34.

To facilitate the charging operation, the space between the freezer plate to be charged and the freezer plate immediately thereabove is increased in the following manner: when the stack of freezer plates 26 is raised to bring a selected freezer plate to the level of charging conveyor 24 (and charging slit 20), the stack is displaced to a height exceeding the spacing between the freezer plates so that the freezer plate just charged comes to rest on brackets affixed to the top of two supports 36 arranged at respective sides of the stack of freezer plates and hinged to floor 12 of the freezer housing. These supports are normally biased by springs (not shown) into a position wherein the brackets project into the interior of the stack of freezer plates to support the freezer plates situated above their plane of support, and they are equipped with ramps or inclined planes causing them to be moved apart by the freezer plates in the course of their ascending movement. When the freezer plate just charged has been raised above the plane of support of the brackets, they assume their normal position again; when the stack of freezer plates is caused to descend, this freezer plate and the freezer plates thereabove will come to rest on the brackets. Due to the fact that the difference in the levels of the support plane of the brackets and of charging conveyor 24 exceeds the spacing between the freezer plates, the freezer plate to be charged is thus above the level of the charging conveyor and the descending movement is continued until it has reached that level.

In the above description of the operation, it has been supposed that the freezer plates are charged and discharged by raising the stack of freezer plates, the uppermost plate being charged first and the lowermost freezer plate being charged last. When all the freezer plates have been charged, the stack is brought to its low position and a new charging operation beginning with the uppermost freezer plate is begun. However, it is also possible to charge and discharge the freezer plates in a descending movement of the stack of freezer plates, or to charge alternating plates in the course of an ascending movement while the remaining freezer plates are charged in a descending movement. For these latter modes of charging to be possible, it is necessary for hinged supports 36 to be controlled by jacks permitting them to be moved apart to permit passages of the freezer plates in the course of the descending movement of the stack of freezer plates.

Figure 2:
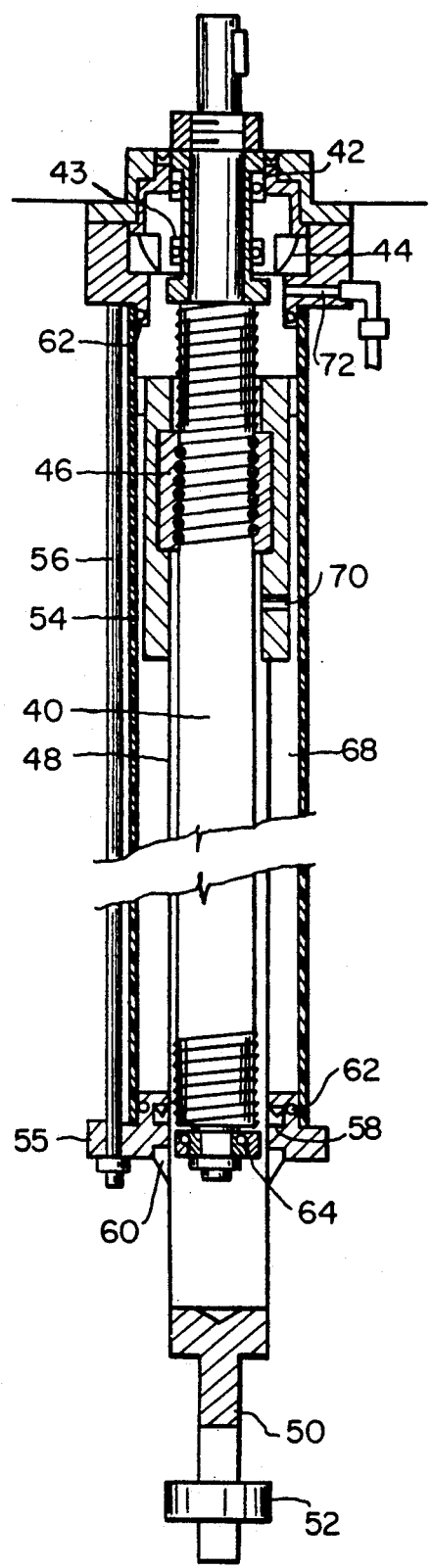
FIG. 2 shows a longitudinal section of one of the screw jacks supporting and vertically displacing the freezer plates.

The structure of screw jacks 30 of the present invention is shown in FIG. 2. Each screw jack comprises screw element 40 and nut 46 engaging the screw element, and the illustrated screw jack comprises ball bearing 45 with circulating bearing balls interposed between the screw element and the nut. Tube element 48 concentrically surrounds screw element 40 and nut 46 is affixed to one end of the tube element while the opposite end of the tube element is closed. One of the screw jack elements is pendularly suspended from the freezer housing while the stack of freezer plates 26 is suspended on the other screw jack element. In the illustrated embodiment, screw element 40 is suspended from the freezer housing, i.e. ceiling 14, and the stack of freezer plates is suspended from tube element 48.

As shown, the pendular suspension of screw element 40 on ceiling 14 comprises abutment 42 on the ceiling, roller bearing 43 rotatively bearing the screw element and ball-and-socket bearing 44 pendularly supporting the screw element. The socket of bearing 44 is affixed to the housing, i.e. the abutment on the housing ceiling. The lower end of tube element 48 is attached to platform 28 (see FIG. 1) by means of catch 50 and transverse shaft 52 engaging the platform supporting the stack of freezer plates 26. The catch is integral with a bush inserted into the lower end of tube element 48 and welded thereto.

Tubular casing 54 concentrically surrounds tube element 48 and the lower end of the tube element passes fluid-tightly through the tubular casing bottom in a manner to be described hereinbelow. The tubular casing is comprised of a translucent or transparent material. The interiors of tube element 48 and tubular casing 54 are in communication with each other in a manner to be described hereinbelow to define a closed space of a predetermined volume, and this closed space is filled with lubricating oil (not shown). The tubular casing extends between ball-and-socket bearing 44 pendularly suspending screw element 40 from freezer housing ceiling 14 and guide collar 55, which constitutes the bottom of tubular casing 54. Collar 55 is mounted on tube element 48 with some tolerance therebetween and tie rods 56 connect the collar to the bearing socket. Fluid-tight joint 58 is arranged between the collar and tube element 48 and toric joint 62 is mounted between the collar and tubular casing 54, thus assuring fluid-tight connections between these components of the screw jack. Collar 55 is equipped with scraper 60 frictionally engaging tube element 48 and thus detaching any ice formed on the tube element during operation, which ice formation could deteriorate the fluid-tightness of the arrangement. Tubular casing 54 and tie rods 56 are made of a material of sufficient flexibility to enable the screw jack to execute pendular movements of small amplitude. The tubular casing may be made of a glass fiber reinforced synthetic resin, for example.

Screw element 40 has a free end spaced from nut 46 and ball bearing 64 is rotatively and coaxially mounted on the free screw element end. Ball bearing 64 has a diameter slightly smaller than that of the tube element to provide a sufficient gap between the ball bearing and tube element 48 for avoiding interference with free relative movement between screw element 40 and tube element 48 while limiting any flexing deformations of these elements.

The interior chamber of tube element 48 communicates with annular chamber 68 between the tube element and tubular casing 54 through a hole or a plurality of holes 70 piercing nut 46 or the tube element, and there is a sufficient gap between the screw and tube elements, and one or more grooves are machined into the periphery of ball bearing 64 to assure communication between these chambers. Furthermore, annular chamber 68 is in communication with the interior chamber of tubular casing 54 above nut 46 by axially extending grooves machined into the periphery of the nut. A closed expansion reservoir of air is connected to this upper part of the interior tubular casing chamber through bore 72 machined in the socket of bearing 44 and hose 74 (see FIG. 1) leading from bore 72 to this expansion air reservoir. In the illustrated embodiment, the closed expansion air reservoir is constituted by hollow post 18 whose interior provides a fluid-tight chamber. The interior of tube element 48 and annular chamber 68 are filled with lubricating oil. The closed air expansion reservoir above the oil level prevents humid air from the outside from entering the interior of tubular casing 54 when the oil level is lowered upon elongation of the screw jack.

As shown in FIG. 1, motor 66 is coupled to screw element 40 for rotating the screw element about its axis in either direction to displace the freezer plates vertically and the motor may be braked to hold the plates at any selected level. The motor, which may be manually or automatically controlled, comprises a counter permitting the amount of vertical displacement to be measured. For charging the products to be frozen, the motors for the screw jacks are individually controlled by proximity detectors disposed at the level of charging conveyor 24 at the four corners of the stack of freezer plates.

While the invention has been described in connection with a now preferred embodiment thereof, equivalent means may be substituted for any of those disclosed. More particularly, for example, the position of the screw jacks may be reversed, i.e. tube element 48 may be mounted rotatively on housing frame 10 and platform 28 supporting the stack of freezer plates 26 may be suspended from screw element 40. Other modifications may readily occur to those skilled in the art.

What is claimed is:

1. A freezer comprising
   (a) an insulated housing including a frame and having two opposite walls defining an interior chamber therebetween, the walls respectively defining
      (1) a charging opening and a discharge opening for respectively charging products to be frozen into the interior chamber and discharging the frozen products from the interior chamber,
   (b) a stack of horizontal freezer plates arranged in the interior chamber, and
   (c) vertical screw jack means for vertically displacing the stack of freezer plates whereby said freezer plates are successively moved to the level of the openings, each screw jack of said means comprising
      (1) a screw element,
      (2) a nut engaging the screw element,
      (3) a tube element having two ends, the tube element concentrically surrounding the screw element, the nut being affixed to one of the tube element ends and the opposite tube element end being closed, and one of the screw jack elements being pendularly suspended from the freezer housing frame while the stack of freezer plates is suspended on the other screw jack element, and
      (4) a tubular casing having a bottom, the tubular casing concentrically surrounding the tube element and the tube element passing fluid-tightly through the tubular casing bottom, the interiors of the tube element and of the tubular casing being in communication with each other to define an oil-filled closed space of a predetermined volume,
   (c) a closed expansion reservoir of air connected to an upper part of the closed space, and
   (d) a motor coupled to the one screw jack element for rotating the one screw jack element.

2. The freezer of claim 1, wherein the housing frame comprises a hollow post constituting the closed expansion reservoir of air.

3. The freezer of claim 1, wherein the tubular casing is comprised of a translucent or transparent material.

4. The freezer of claim 1, comprising a ball-and-socket bearing pendularly suspending the one screw jack element on the housing frame, the socket of the bearing being affixed to the housing frame.

5. The freezer of claim 4, further comprising a collar constituting the bottom of the tubular casing, the tube element passing through the collar, tie rods connecting the collar to the bearing socket and the tubular casing being held between the bearing socket and the collar.

6. The freezer of claim 1, further comprising ball bearing means having circulating bearing balls interposed between the screw element and the nut.

7. The freezer of claim 1, wherein the screw element has a free end spaced from the nut, further comprising a ball bearing rotatively and coaxially mounted on the free screw element end, the ball bearing having a diameter slightly smaller than that of the tube element to provide a sufficient gap between the ball bearing and the tube element for avoiding interference with free relative movement between the screw element and the tube element while limiting any flexing deformations of the elements.

* * * * *